(12) United States Patent
Fukuyori

(10) Patent No.: US 8,519,841 B2
(45) Date of Patent: *Aug. 27, 2013

(54) SYSTEMS AND METHODS FOR DYNAMICALLY CHANGING ALERTS OF PORTABLE DEVICES USING BRAINWAVE SIGNALS

(75) Inventor: Masahiro Fukuyori, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 978 days.

This patent is subject to a terminal disclaimer.

(21) Appl. No.: 12/579,180

(22) Filed: Oct. 14, 2009

(65) Prior Publication Data

US 2011/0084795 A1    Apr. 14, 2011

(51) Int. Cl.
*G08B 23/00* (2006.01)

(52) U.S. Cl.
USPC .......... 340/500; 600/544; 600/545; 600/300; 341/20

(58) Field of Classification Search
USPC ........... 341/20; 600/544, 545, 300; 340/500
See application file for complete search history.

(56) References Cited

U.S. PATENT DOCUMENTS

| | | | |
|---|---|---|---|
| 5,983,129 A * | 11/1999 | Cowan et al. | 600/544 |
| 6,292,688 B1 * | 9/2001 | Patton | 600/544 |
| 6,487,444 B2 * | 11/2002 | Mimura | 600/544 |
| 7,761,144 B2 * | 7/2010 | Cox et al. | 600/544 |
| 7,942,828 B2 * | 5/2011 | Teicher et al. | 600/558 |
| 8,157,609 B2 * | 4/2012 | Hallaian et al. | 446/173 |

OTHER PUBLICATIONS

United States Patent Application, U.S. Appl. No. 12/579,201; pp. 19, Oct. 14, 2009.
United States Office Action; U.S. Appl. No. 12/579,201; pp. 20, May 9, 2012.

* cited by examiner

*Primary Examiner* — Daryl Pope
(74) *Attorney, Agent, or Firm* — Baker Botts L.L.P.

(57) ABSTRACT

A method for dynamically adjusting alerts of a portable electronic device is provided. The method may include steps for receiving, from a threshold value associated with an attention level of a user. The method may also include receiving one or more numeric values corresponding to a current mental state of a user from a brainwave sensor. Next, the method may compare the one or more numeric values from the brainwave sensor and the received threshold, and based at least on the comparison, the method may automatically adjust at least one alert of the portable electronic device.

23 Claims, 3 Drawing Sheets

SYSTEMS AND METHODS FOR DYNAMICALLY CHANGING ALERTS OF PORTABLE DEVICES USING BRAINWAVE SIGNALS

TECHNICAL FIELD

The present disclosure relates to portable electronic devices, and in particular, systems and methods for dynamically changing alerts of the portable electronic devices based at least on brainwave signals.

BACKGROUND

Some portable electronic devices may provide alert signals to a user indicating an incoming call, incoming text message, incoming short message service (SMS), upcoming appointments scheduled and noted in a calendar, alarm clocks, etc. Various types of alerts may be used to signal the user including, for example, a ringing sound and/or a mechanical vibration. A ringing sound or ringtone (e.g., a sequence of musical notes such as in a song or jingle, voices, sayings, or other audible sounds and noises) may use an electronic signaling device, such as a buzzer or loudspeaker, for example. In some cases, the ringing sound is provided in different cadences and with different loudness levels so that a user may select and fix a cadence and a sound intensity preferred by that user. The mechanical vibration using, for example, an electromechanical vibrator may be embedded in the portable electronic device. A vibrator mechanically vibrates the portable electronic device, communicating an alert signal and thus provides a relatively silent or less obtrusive alert signal as compared to the mechanical ring sound. Most users set the portable electronic device to the audible, ringing alert for most purposes, except where a meeting or similar event is occurring.

A disadvantage of manual selection between the ringing sound and mechanical vibration is that if a user forgets to manually disable the alert(s), an interruption caused by the ringing sound during an inopportune time such as, for example, during a meeting, during church services, and/or other public or private functions.

Another disadvantage is that the manual selection of a loudness or sound intensity by the user may fix the loudness or sound intensity for all environments, until the user manually changes the sound level. A selected (and fixed) sound level may be too low in a noisy environment and/or may be too high and intrusive in an intimate, low-key environment.

SUMMARY

In accordance with certain embodiments of the present disclosure, a method for dynamically adjusting alerts of a portable electronic device is provided. The method may include steps for receiving from a user, a threshold value associated with an attention level of the user. The method may also include receiving one or more numeric values from a brainwave sensor, the numeric values corresponding to a current attention level of the user. The method may also include comparing the received one or more numeric values from the brainwave sensor and the received threshold value, and based at least on the comparison step, automatically adjusting at least one alert mode of the portable electronic device.

In accordance with other embodiments of the present disclosure, a system for dynamically adjusting alerts of a portable electronic device is provided. The system may include a brainwave sensor configured to measure one or more brainwave signal. The system may also include a portable electronic device communicatively coupled to the brainwave sensor, where the portable electronic device is configured to receive from the brainwave sensor one or more numeric values corresponding to a current mental state of a user. The portable device may also be configured to receive from a user a threshold value associated with an attention level of the user. The portable device may be configured to compare the one or more received numeric values from the brainwave sensor and the received threshold and based at least on the comparison, automatically adjusting at least one alert of the portable electronic device.

The system and method of the present disclosure provides technical advantages including, for example, dynamically adjusting an alert system of a portable device based at least on a user's attention level, thus avoiding any need for manually setting the portable device to a certain mode for different social environments.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1A:
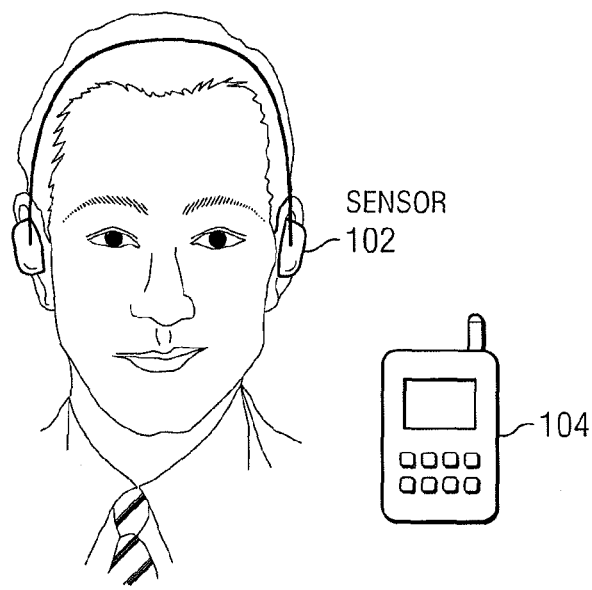
FIGS. 1A and 1B illustrate an example system for measuring brainwave signals and dynamically adjusting alerts of a portable electronic device, in accordance with particular embodiments of the present disclosure.
Figure 1B:
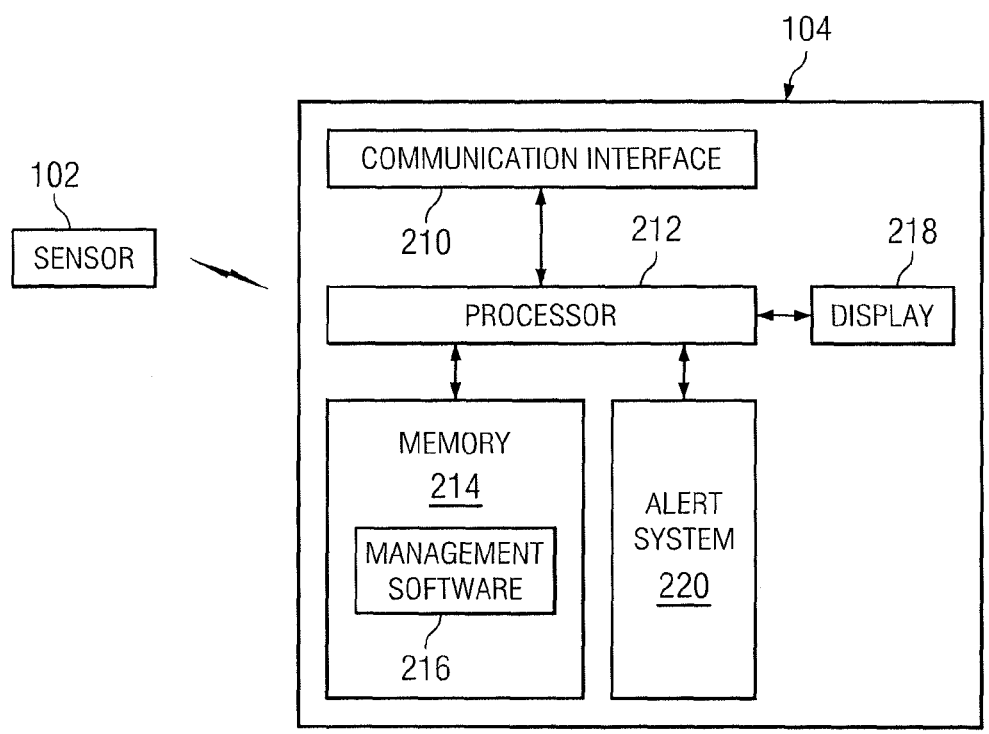
Figure 2:
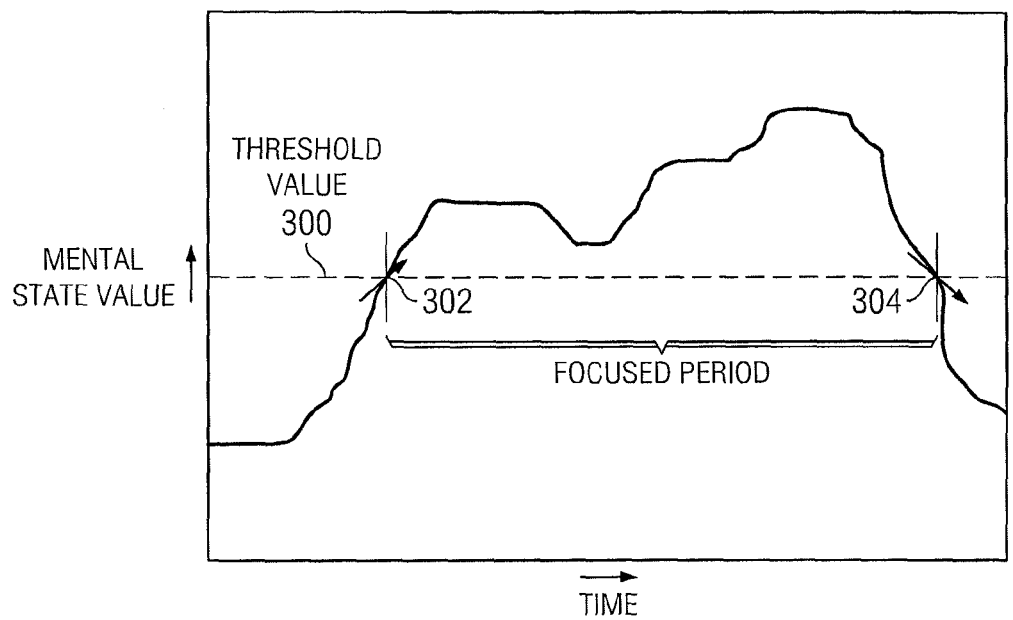
FIG. 2 illustrates an example graph for changing alerts of a portable electronic device based on a threshold setting, in accordance with particular embodiments of the present disclosure.
Figure 3:
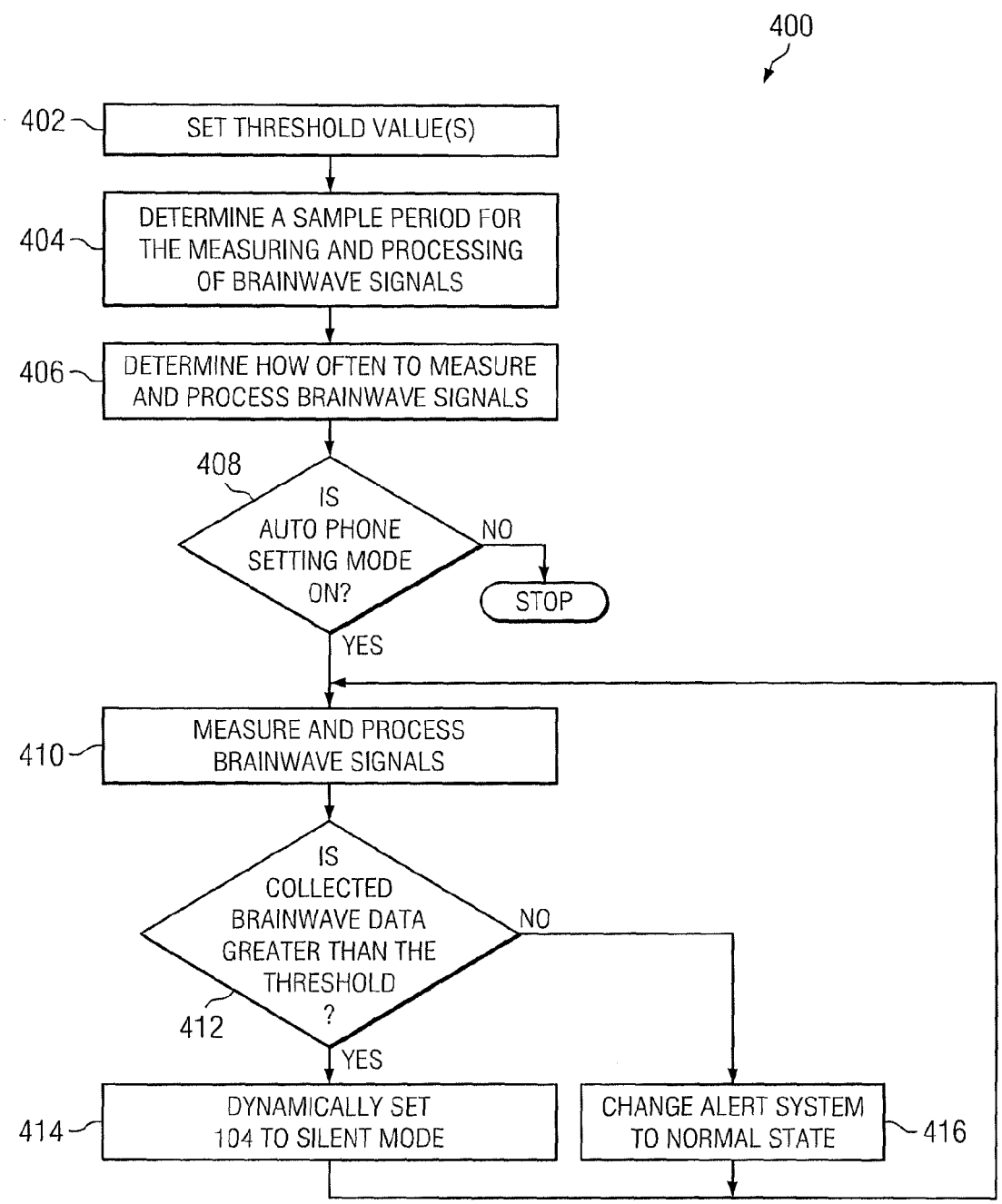
FIG. 3 illustrates an example flow chart for dynamically adjusting alerts of portable electronic devices based on measured brainwave data, in accordance with particular embodiments of the present disclosure.

Preferred embodiments and their advantages are best understood by reference to FIGS. 1 through 3, wherein like numbers are used to indicate like and corresponding parts.

For purposes of this disclosure, a portable electronic device may include any portable instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a portable electronic device may be a personal computer (e.g., a tablet computer, a notebook computer), a cellular phone, a personal digital equipment (PDA), or any other suitable portable device and may vary in size, shape, performance, functionality, and price. The portable electronic devices may include random access memory (RAM), one or more processing resources such as a central processing unit (CPU) or hardware or software control logic, ROM, and/or other types of nonvolatile memory. Additional components of the portable electronic devices may include one or more disk drives, one or more network ports for communicating with external devices as well as various input and output (I/O) devices, such as a keyboard, a mouse, and/or a video display. The portable electronic devices may also include one or more buses operable to transmit communications between the various hardware components.

FIGS. 1A and 1B illustrate a system for dynamically adjusting alerts of portable electronic device 104 based on brainwave signals measured by sensor 102, in accordance with particular embodiments of the present disclosure. In particular, sensor 102 combined with portable electrical device 104 may be used to automatically disable and/or adjust the alert(s) (e.g., volume and/or cadence) of portable electronic device 104 in various environments including, for example, in the car, at work, at home, in meetings, in restaurants, at the movies, at sporting events, and/or other public or private environments based at least on measured brainwave signals.

Sensor 102 may include a sensor such as, for example, a wet electrode sensor or dry active electrode sensor configured to detect brainwave signals of a user. An example of sensor 102 is described in U.S. Patent Publication No. 2008/0177197 by Lee et al., which is incorporated herein by reference. In some embodiments, sensor 102 may be integrated with headgear that may be worn by a user. Examples of headgear may include, for example, headsets, headbands, glasses, various types of hats, helmets, caps, etc. Alternatively, sensor 102 may be fully integrated into portable electronic device 104.

In one embodiment, sensor 102 may measure electroencephalogram (EEG) signals, electromyography (EMG) signals, and/or other brainwave signals. The brainwave signals may indicate an attention level (e.g., levels of concentration, levels of distraction, etc.) of the user. In some embodiments, sensor 102 may assign a numerical value associated with the attention level ranging between, for example 0 to 100, with 0 indicating the lowest level of attention and 100 indicating a maximum level of attention. It is noted that other ranges may be assigned to determine the attention level of the user.

The measured brainwave signals may subsequently be communicated to and processed by a processor communicatively coupled to sensor 102 (e.g., processor 212 of portable electronic device 104). Based at least on the measured brainwave signal(s), processor 212 may determine to set portable electronic device 104 to a particular mode (e.g., a silent mode wherein non-audible alerts such as a vibration or a visual alert are communicated, a low-volume mode wherein a low-volume alert is communicated, a high-volume mode wherein a high-volume alert is communicated, etc.). Details of the signal processing are described in more detail below with respect to portable electronic device 104.

Portable electronic device 104 may be communicatively coupled to sensor 102 and may include communication interface 210, processor 212, memory 214, display 218, and alert system 220. Communication interface 210 may include any system, device, or apparatus configured for wired and/or wireless communication with external devices, for example sensor 102, as well as various input and output (I/O) devices, for example a keyboard, a mouse, etc. In some embodiments, communication interface 210 may serve as an interface between portable electronic device 104 and a network using any suitable transmission protocol and/or standard. For example, communication interface 210 may provide an interface between sensor 102 and portable electronic device 104, wherein the measured brainwave signal(s) by sensor 102 may be communicated to processor 212 for processing.

Processor 212 may include any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 212 may receive measured brainwave signals from sensor 102 via communication interface 210 and may be configured to process the brainwave signals to determine the attention level of the user. For example, sensor 102 may measure one or more attention levels of a user and communicate the one or more measured attention levels to processor 212 via, for example, a Bluetooth® interface or other suitable interface in communication with communication interface 210. In some embodiments, sensor 102 and/or processor 212 may assign a numerical value to the measured attention levels. In such embodiments, processor 212 may determine if the numerical value associated with the one or attention levels is less than, equal to, or greater than a threshold set by, for example, the user. Based at least on the comparison of the numerical value associated with the attention level(s) and the threshold, processor 212 may communicate with alert system 220 an instruction to adjust one or more alerts. For example, the instruction to adjust the one or more alerts may include an instruction to change a volume of alert, an instruction to change the type of alert (e.g., from an audible alert to a non-audible tactile alert such as a vibration, from an audible alert to non-audible visual alert, from a non-audible alert to an audible alert, etc.).

Memory 214 may be communicatively coupled to processor 212 and may include any system, device, or apparatus operable to retain program instructions or data for a period of time. Memory 214 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to portable electronic device 104 is powered down or off. In some embodiments, memory 214 may store program instructions (e.g., management software 216), configuration data (e.g., threshold values for adjusting alert(s) of portable electronic device 104), and/or other data.

Management software 216 may include a program of instructions that, when executed by a processor, e.g., processor 212, may manage the processing of brainwave signals received from sensor 102, the comparison of the brainwave signals to one or more thresholds set by a user and stored in, for example, memory 214, and the adjustment of alert system 220 based at least on the comparison. In some embodiments, management software 216 may be configured to display to a user via, for example, display 218, a graphical user interface (GUI) such that a user may input one or more thresholds values based at least on measurements of the user's attention level. For example, a user's personal high attentive state may be measured by sensor 102 and may have a range of values between, for example, about 85-95. The user's personal low attentive state (e.g., distractive state) may have a range of values of, for example, about 25-35. The user may enter these values and such values may be used as thresholds values. Management software 216 and/or processor 212 may receive current measured brainwave signals and may compare the current measured brainwave signals to the thresholds. Based at least on the comparison, processor 212 may enable, disable, or otherwise alter alert system 220. Display 218 coupled to processor 212 may be any display device suitable for creating graphic images and/or alphanumeric characters recognizable to a user, and may include, for example, a liquid crystal display (LCD) or a cathode ray tube (CRT). As noted above, display 218 may display GUIs that may require input from a user. Display 218 may also display the status of alert system 220, visual alerts, and/or other data. Alert system 220 may be communicatively coupled to processor 212 and may be any system, device, or apparatus configured to provide an alert to the user. In one embodiment, alert system 220 may be a ringing system configured to provide an audible signal to the user in the event of an incoming phone call, received text message, received SMS message, received voicemail, received download, alarm, reminder, and/or other events or tasks. In the same or alternative embodiments, alert system 220 may include a mechanical vibration system configured to provide an audible and/or tactile signal when an event occurs on portable electronic device 104. Similarly, alert system 220 may provide a visual alert displayed on display 218 in connection with an event occurring on portable electronic device 104. The visual alert may be a blinking indicator, an icon displayed on display 218, a summary of the event displayed in alphanumeric characters on display 218, and/or other visual alert.

In operation, a user may set one or more thresholds via, for example, an interface displayed on display 218 and/or an input device communicatively coupled to portable electronic device 104. The thresholds may be based on, for example, a calibration of the user's personal attention levels (e.g., numeric values between 0 and 100). For example, the user's personal attention level values may be determined continuously or may based on average readings by sensor 102 over a particular time interval. In some embodiments, sensor 102 and/or processor 212 may evaluate only one attention level (e.g., fully attentive) to determine whether or not to adjust alert system 220. For example, sensor 102 may provide processor 212 measured brainwave signals and processor 212 may compare the measured brainwave signals to that of the user's threshold range. If the value of the measured brainwave signal falls within the range, processor 212 may alter alert system 220 (e.g., from an audible alert to a tactile alert and/or visual alert) when an event occurs on portable electronic device 104.

FIG. 2 illustrates an example graph for changing alerts of portable electronic device 104 based on a user's threshold setting, in accordance with embodiments of the present disclosure. Threshold 300 may be a value set by a user for a specific attention level, for example, a highly attentive state. In some embodiments, at point 302, an attention level value measured by sensor 102 and processed by processor 212 may exceed the user's set threshold value (indicating a state of focus), and thus, alert system 220 may be altered (e.g., silent mode may be enabled, an audible alert may be disabled, and/or a visual alert and/or tactile alert may be enabled). At time 304, the measured attention level value may drop back below the threshold value, and thus, alert system 220 may be restored to a previous setting (e.g., the setting before the silent mode was enabled at point 302).

Accordingly, the user may enable certain features of portable electronic device 104 allowing for dynamic altering of alert system 220. For example, portable electronic device 104 may include a "dynamic silent mode" feature that may automatically disable alert system 220 based on a comparison between a measured brainwave signal and a threshold value such that no audible, visual, and/or tactile alert occurs. The dynamic silent mode may differ from the manual adjustment of the volume control, the vibration control, and/or other controls associated with portable electronic device 104 as the dynamic silent mode may automatically adjust the volume to and/or visual and/or tactile alerts in response to the user's brainwave signals. The user may enable the dynamic silent mode feature, allowing for dynamic alert adjusting controlled by management software 216, sensor 102, and/or processor 212.

The user may also set one or more configurations for collecting brainwave signals from sensor 102. In some embodiments, the user may set an average time period for measuring brainwave signals for evaluation. For example, the user may set a five-minute interval in which brainwave signals may be collected by sensor 102 and processed by processor 212. At the end of the five-minute interval, if the brainwave signals collected indicate an attention level is consistent, for example, the numeric values representing the attention level are consistently above or below a threshold during the five minute or if an average of the values during the time interval is above or below a threshold, processor 212 may communicate with alert system 220 an instruction to change one or more alerts or maintain a current alert setting.

In some embodiments, sensor 102 may continuously measure brainwave signals of a user and processor 212 may update alert system 220 based on the measured signals. In the same or alternative embodiments, the user may determine how often to check for updated brainwave signals. For example, the user may set a predetermined time interval to check if the user's attention level has changed, e.g., every 30 minutes. Every 30 minutes, sensor 102 may begin collecting brainwave signals. Sensor 102 may collect brainwave signals over a specific time period, e.g., five minutes. If the attention level remains about the same as the previous attention levels measured no action may be needed by processor 212, and in particular, no changes may be made to alert system 220. If the attention level has changed since the previous attention level measurement (e.g., the attention level is above or below a threshold value), processor 212 may alter alert system 220 accordingly.

FIG. 3 illustrates an example method 400 for dynamically adjusting alerts of portable electronic devices based on measured brainwave data, in accordance with embodiments of the present disclosure. At step 402, 404, and 406, a user may provide one or more configuration settings for dynamically adjusting alerts. One or more of the configurations made at step 402, 404, and 406 may be used to determine if alert system 220 needs to maintain a current setting or change the alerts on portable electronic device 104.

At step 402, a user may set one or more threshold values. In one embodiment, via, for example an interface displayed on display 218, a user may set one or more threshold values (e.g., a numeric value range between 0 and 100, wherein each range corresponds to the user's average value for one or more particular attention level). For example, if a user desires that sensor 102 measure only a highly attentive state a field requesting the user's personal values may be displayed on display 218, and the entered personal values may be used as a threshold value.

At step 404, the user may determine a sample period that may define how long to measure and process brainwave signals. In one embodiment, the user may set the sample period as five minutes, where during the five minutes, sensor 102 may continuously measure one or more attention level, assign a range of values associated with the measured attention level, communicate the values to processor 212, where processor 212 may determine if the values or an average of the values collected during the sample period exceeds, is less than, or is equal to the threshold set at step 402.

At step 406, the user may determine a how often or the frequency for the measuring and processing of brainwave signals occurs. In one embodiment, the user may select a continuous frequency where the measuring and processing of brainwave signal occurs instantaneously on a continuous basis. Alternatively, the user may set a periodic frequency for measuring and processing of brainwave signals. For example, the user may desire to collect and process brainwave signals every thirty minutes. Every thirty minutes, sensor 102 may measure brainwave signals (e.g., measure the brainwave signals over the sample period set at step 404), assign a value for the measured brainwave signals, and communicate the values to processor 212 so that processor 212 may compare the values or an average of the values to a threshold set at step 402.

At step 408, processor 212 or another suitable component may determine whether one or more features of portable electronic device 104 are enabled and/or disabled. For example, processor 212 may determine whether a dynamic silent mode feature is enabled, wherein the dynamic silent mode feature may enable a visual and/or tactile alert while disabling an audible alert. If the dynamic silent mode feature is enabled, method 400 may proceed to step 410. If the dynamic silent mode feature is disabled, method 400 may end and any adjustments to alert settings may need to be made the user may need to manually change the alerts delivered on portable electronic device 104.

At step 410, brainwave signals may be measured by sensor 102 and processed by processor 212 based on the user's configurations described above. In one embodiment, sensor 102 and processor 212 may evaluate only one attention level (e.g., highly attentive). In alternative embodiments, sensor 102 and processor 212 may evaluate multiple attention levels such as, for example, highly attentive or distracted. It is noted other attention level or attention level combinations may be measured and processed at step 410.

At step 412, if the processed brainwave signals does not exceed the threshold value set at step 402, the alert system 220 may be kept at or changed to a normal setting (e.g., audible alert is active) at step 416. Method 400 may then proceed again to step 410 where, based at least one of steps 402, 404, 406, and/or 408, the steps of measuring and processing brainwave signals by sensor 102 and processor 212 may occur again.

If the processed brainwave signal exceeds the threshold value set at step 402, method 400 proceeds from step 412 to step 414 where processor 212 may communicate to alert system 220 an adjustment to the current alert setting. In one embodiment, processor 212 may communicate an instruction to disable one or more alerts of alert system 220. For example, processor 212 may communicate with alert system 220 to disable any audible signal and enable the visible and/or tactile alerts when an event occurs at portable electronic device 104 (e.g., a silent mode setting). Alert system 220 may maintain this setting until an updated communication is provided by processor 212 (step 410 and 412) and/or if a user manually overrides the settings.

The systems and methods of the present disclosure provide a configurable system and technique for dynamically adjusting alerts of a portable electronic device based on, for example, the attention level of the use and/or configuration settings established by the user. These dynamic configurations may provide portable electronic device settings that suit the immediate needs of the user (e.g., based on the user's attention level) as well as provide the capability of changing the configurations if the user's needs change.

Although the present disclosure has been described in detail, it should be understood that various changes, substitutions, and alterations may be made hereto without departing from the spirit and the scope of the invention as defined by the appended claims.

What is claimed is:

1. A method for dynamically adjusting alerts of a portable electronic device, the method comprising:
   receiving a threshold value from a user, wherein the threshold value comprises a threshold value associated with an attention level value of the user;
   receiving one or more numeric values from a brainwave sensor, the numeric values corresponding to a current attention level of the user;
   comparing the received one or more numeric values from the brainwave sensor and the received threshold value; and
   based at least on the comparison, automatically adjusting at least one alert mode of the portable electronic device.

2. The method according to claim 1, further comprising receiving a configuration setting from a user, the configuration setting comprising a sample period setting, which determines how long to collect the one or more numeric values from the brainwave sensor.

3. The method according to claim 1, further comprising receiving a configuration setting from a user, the configuration setting comprising a frequency setting, which determines how often to collect the one or more numeric values from the brainwave sensor.

4. The method according to claim 1, further comprising determining a status of a dynamic silent mode feature of the portable electronic device and automatically adjusting an audible alert level the portable electronic device in response to a determination that the dynamic silent mode feature is enabled.

5. The method according to claim 1, wherein the alert comprises at least one of: an audible alert, a visual alert displayed on a display of the portable electronic device, and a mechanical vibration.

6. The method according to claim 1, wherein the sensor comprises a dry active electrode sensor integral with headgear worn by the user or integral to the portable electronic device.

7. The method according to claim 1, wherein the attention level comprises at least one of: a highly attentive level and a distracted level.

8. A system for dynamically adjusting alerts of a portable electronic device, the system comprising:
   a brainwave sensor configured to measure one or more brainwave signals;
   a portable electronic device communicatively coupled to the brainwave sensor, wherein the portable electronic device is configured to:
      receiving one or more numeric values from the brainwave sensor, the one or more numeric values corresponding to a current attention level of a user;
      receiving a threshold value from the user, wherein the threshold value comprises a threshold value associated with an attention level value of the user;
      comparing the one or more received numeric values from the brainwave sensor and the received threshold value; and
      based at least on the comparison, automatically adjusting at least one alert mode of the portable electronic device.

9. The system according to claim 8, wherein the sensor comprises a dry active electrode sensor integral with a headgear worn by the user.

10. The system according to claim 8, wherein the sensor is integral to the portable electronic device.

11. The system according to claim 8, wherein the portable electronic device is further configured to determine a status of a dynamic silent mode feature of the portable electronic device.

12. The system according to claim 11, wherein the portable electronic device is further configured to automatically adjust the at least one alert mode of the portable electronic device in response to a determination that the dynamic silent mode feature is enabled.

13. The system according to claim 8, wherein the alert comprises at least one of: an audible alert, a visual alert displayed on a display of the portable electronic device, and a mechanical vibration.

14. The system according to claim 8, wherein the attention level comprises at least one of: a highly attentive level or a distractive level.

15. The system according to claim 8, the processor is further configured to receive a configuration setting from a user, the configuration setting comprising a sample period setting, which determines how long to collect the one or more numeric values from the brainwave sensor.

16. The system according to claim 8, the processor is further configured to receive a configuration setting from a user, the configuration setting comprising a frequency setting, which determines how often to collect the one or more numeric values from the brainwave sensor.

17. Non-transitory computer readable media comprising program instructions, the program instructions configured to, when executed by a processor:
receive a threshold value from the user, wherein the threshold value comprises a threshold value associated with an attention level value of a user;
receive one or more numeric values from a sensor, the numeric value corresponding to a current attention level of the user;
compare the one or more received numeric values from the brainwave sensor and the received threshold value; and
based at least on the comparison, automatically adjusting at least one alert mode of the portable electronic device.

18. The non-transitory computer readable media according to claim 17, wherein the program instructions are further configured to, when executed by the processor:
receive a configuration setting from a user, the configuration setting comprising a sample period setting, which determines how long to collect the one or more numeric values from the brainwave sensor.

19. The non-transitory computer readable media according to claim 17, wherein the program instructions are further configured to, when executed by the processor:
receive a configuration setting from a user, the configuration setting comprising a frequency setting, which determines how often to collect the one or more numeric values from the brainwave sensor.

20. The non-transitory computer readable media according to claim 17, wherein the program instructions are further configured to determine a status of a dynamic silent mode feature of the portable electronic device.

21. The non-transitory computer readable media according to claim 17, wherein the program instructions are further configured to automatically adjust the at least one alert mode of the portable electronic device in response to a determination that the dynamic silent mode feature is enabled.

22. The non-transitory computer readable media according to claim 17, wherein the alert comprises at least one of: an audible alert, a visual alert displayed on a display of the portable electronic device, and a mechanical vibration.

23. The non-transitory computer readable media according to claim 17, wherein the attention level comprises at least one of: a fully attentive level or a distractive level.

* * * * *